United States Patent [19]

La Coste

[11] 4,274,438
[45] Jun. 23, 1981

[54] METHOD OF DIAGNOSTIC VALVE TESTING

[75] Inventor: Bernard L. La Coste, Wilmington, Del.

[73] Assignee: Westinghouse Electric Corp., Pittsburgh, Pa.

[21] Appl. No.: 13,701

[22] Filed: Feb. 21, 1979

[51] Int. Cl.³ ........................ F16K 37/00; G01D 9/28
[52] U.S. Cl. .......................................... 137/551; 73/9; 91/1; 92/5 R; 346/49
[58] Field of Search ........................... 137/551; 73/168

[56] References Cited

U.S. PATENT DOCUMENTS

| | | | |
|---|---|---|---|
| 3,098,382 | 7/1963 | Hoffman et al. | 73/168 |
| 3,099,163 | 7/1963 | Raymond | 73/168 |
| 3,939,688 | 2/1976 | Misch et al. | 73/168 X |
| 3,939,690 | 2/1976 | Kuss et al. | 73/9 |
| 4,002,065 | 1/1977 | Lardi et al. | 73/168 |
| 4,029,122 | 6/1977 | Jaegtnes | 137/551 |

Primary Examiner—Daniel M. Yasich
Attorney, Agent, or Firm—W. E. Zitelli

[57] ABSTRACT

A method for testing steam turbine admission valve assemblies for determining the operational force margins present therein which are used to diagnose the likelihood of valve inoperativeness due to the build-up of frictional forces in the valve assembly is disclosed.

3 Claims, 7 Drawing Figures

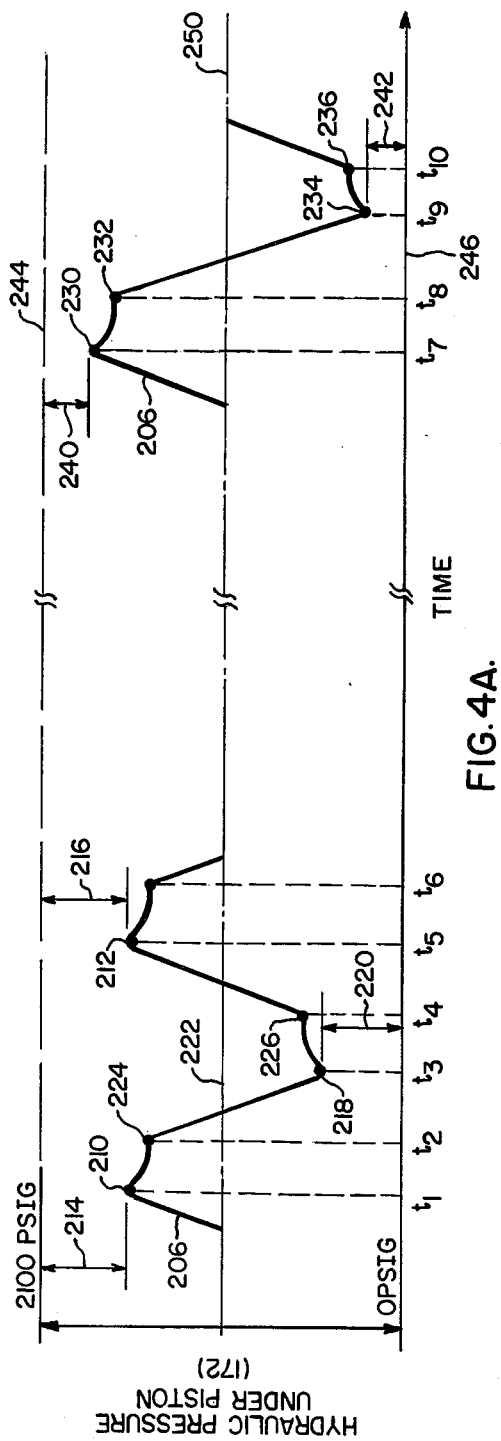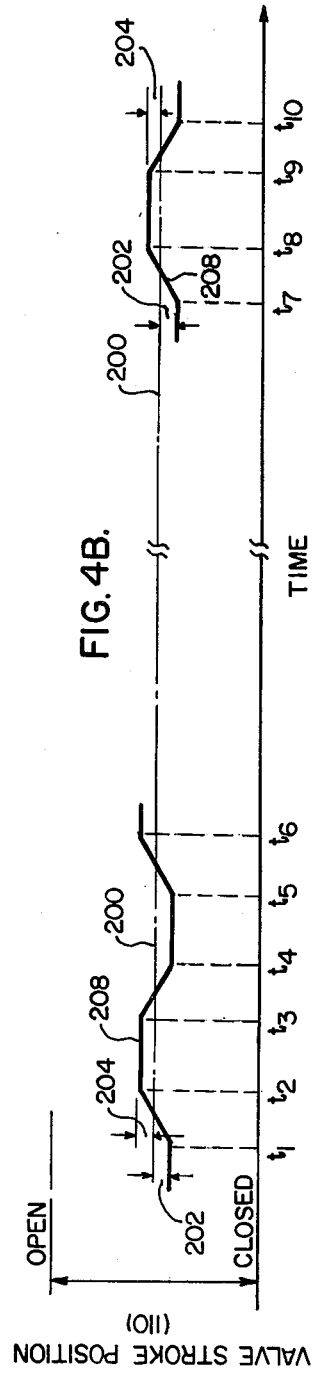

METHOD OF DIAGNOSTIC VALVE TESTING

BACKGROUND OF THE INVENTION

The invention relates broadly to the testing of steam turbine admission valves, and more particularly, to a method of testing the valves to determine the operational force margins present therein.

In a typical steam turbine-generator power plant, similar to the one shown schematically in FIG. 1, a set of throttle valves TV and governor valves GV are disposed in the main steam header which couples the steam turbine 10 to a steam source 12, which may be either a fossil-fueled boiler or nuclear steam supply system, to regulate the amount of steam flowing through the turbine 10. Usually, the steam turbine 10 is comprised of a high pressure HP turbine section 20, and one or more lower pressure turbine sections 22 and 24, all usually cascadedly coupled to a common shaft 28 to drive an electrical generator 30. Steam exiting the HP turbine section 20 is normally reheated in a reheating unit 32 prior to being supplied to the lower pressure turbine sections 22 and 24. After passing through the low pressure turbine section 24, the steam is exhausted into a conventional condenser 36. In most cases, a set of reheat stop valves SV and interceptor valves IV are disposed in the steam line coupling the reheater unit 32 to the lower pressure turbine sections 22 and 24. The reheat stop valves Sv and interceptor valves IV provide for interrupting the steam flow to the lower pressure turbine sections 22 and 24.

Present well known turbine controllers, denoted by the block 40, employ electro-hydraulic mechanisms to position the turbine steam admission valves. For example, in the system of FIG. 1, high pressure hydraulic fluid 41 is supplied to each of the conventional hydraulic valve actuators 42, 44, 46 and 48, respectively associated with each of the steam admission valve sets TV, GV, SV, and IV. The positions of the TV's and GV's may be modulated by the turbine controller 40 by supplying hydraulic fluid position control signals 50 and 52 to their respective hydraulic valve actuators 42 and 44. The turbine controller 40 may in turn monitor the positions of the TV's and GV's by utilizing any of the well known type of position detectors denoted by PDT and PDG, respectively, which are generally coupled to the mechanical valve assemblies. At initial start-up, the turbine controller 40 adjusts the positions of the sets of valves TV and GV to govern the speed of the turbine 10. For power generation applications, the turbine speed is brought up to and synchronized with the frequency of the power network which is denoted by the block 54. At synchronization, a main breaker 56 which couples the electrical output of the generator 30 to the power network 54 is closed to permit electrical energy to flow into the power network 54. Thereafter, the TV's, in general, are maintained in their wide open positions and primary power control is usually conducted through hydraulically positioning the set of GV's using the electrical signal 52 generated by the turbine controller 40. During the normal speed and local control of the turbine-generator, the SV's and IV's are maintained in their wide open position.

There may be times, during the operation of the power plant, when an anomalous condition may occur in the power generating station or power network causing the turbine-generator to incur either a partial or full loss of load. Under these emergency conditions, either all or a portion of the steam turbine admission valves are required to be tripped shut within predetermined times to prevent the steam turbine 10 from reaching limiting overspeed.

In one example (load-rejection), if a sudden change in partial load demand from the power network is incurred and the valve control response of the GV's is such that the mechanical power of the steam turbine 10 cannot be balanced with the new electrical load demand on the generator 30, a phase angle disturbance within the power system will result. Upon detection of this unbalance, the generator 30 may be uncoupled from the system load 54 by opening breaker 56, thus rejecting the entire electrical load on the turbine generator. To prevent turbine overspeed, controller 40 then interrupts steam flow to the high pressure turbine section 20 and to the low pressure turbine sections 22 and 24 by providing actuator dump valve signals 58 and 60 to cause the hydraulic valve actuators 44 and 48 to quickly shut the GV's and IV's, respectively. In one known type turbine controller 40, the IV's are periodically opened and closed with a predetermined time sequence to "bleed-off" the resulting volume of steam entrapped between the closed GV's and IV's until speed control can be restored.

Another example of an emergency condition may be when the main breaker 56 is opened because of a short-circuit fault in the power system. This results in a sudden loss of electrical load on the generator 30. As a consequence, the steam turbine may be accelerated towards dangerous overspeed conditions. To prevent the steam turbine from overspeeding beyond a preset design limit, say 120% of synchronous speed, for example, the turbine controller 40 may generate actuator dump signals 58 and 60 to cause the hydraulic valve actuators 42, 44, 46 and 48 to shut the steam admission valves respectively associated therewith within a predetermined time interval, say 150-200 milliseconds, for example.

If a malfunction should occur in one or more of the steam admission valves to prevent the valve from closing or to prolong its emergency closing time, then the speed of the steam turbine may increase undisturbed beyond its overspeed limitation causing increased centrifugal type forces exerted on the turbine blading which may have significant deleterious effects on the parts of the steam turbine.

For a better understanding of the details of operation of a typical steam admission valve like the TV, GV, SV or IV types shown in FIG. 1, for example, and how a possible malfunction may occur therein, reference is made to the cross-sectional schematic of FIG. 2 wherein there is illustrated an in-line valve arrangement with the electro-hydraulic apparatus associated therewith. It is understood, however, that the principles of operation of the in-line valve may similarly be applied to valves having fulcrum arm linkages or rotating valve shafts such as butterfly valves, for example. Referring to FIG. 2, steam is generally provided to an input port 70 of a valve casing enclosure 72. A structure 74 having a bushing 76 disposed therethrough is seated over the valve casing 72. The bushing 76 is disposed through an opening 78 located on top of the valve casing enclosure 72. Positioned through the bushing 76 is a valve stem 80 having one end which extends into a steam cavity 82 of the enclosure 72. A valve plug 84 is attached to the one end of the valve stem 80 and oriented in such a fashion as to rest on a valve seat 86 within the steam cavity 82 to shut off steam flow through the cavity 82 when the valve stem 80 is positioned in a closed condition. Accordingly, the valve plug 84 permits steam flow through the steam cavity 82 at times when the valve stem 80 is positioned in an opening direction, the steam flow being proportional to the positioning of the valve stem 80 and attached plug 84 with respect to the valve seat 86.

On top of the structure 74 is mechanically coupled a hollowed cylindrical structure 88 enclosed at the top and having a spring assembly 90 longitudinally aligned therein and affixed to the enclosed top portion thereof. The other end of the valve stem 80 is positioned within the structure 88 and coupled to the spring assembly 90. Another enclosed cylinder 92 (hydraulic or pneumatic actuator) is mechanically coupled on top of the cylinder 88 axially aligned substantially with the spring assembly 90 which, in turn, is axially aligned with the valve stem 80. A piston 94 is positioned within the cylinder 92 and connected to the bottom portion of the piston 94 is a piston rod 96 which extends downward through a bushing clearance 98 provided in the base of the cylinder 92 through another bushing clearance 100 in the top of the cylindrical enclosure 88 and longitudinally through the inner portion of the spring assembly 90. A plate structure 102 is attached to the bottom or movable end of the spring assembly 90 and adapted to mechanically couple the piston rod 96, spring assembly 90, and valve steam 80 such that these elements move together proportionately.

A linear variable differential transformer (LVDT) 104 may be affixed longitudinally along an outside surface of the hallowed cylindrical structure 88 and a movable core 106 of the LVDT 104 is mechanically linked to the movement of the spring assembly 90 and piston rod 96 which are proportionately representative of the movement of the valve stem 80. A conventional electronic circuit, shown at block 108, cooperates with the LVDT 104 to convert the mechanical positioning of the core 106 located partially therein to an electrical signal 110 which may be representative of the position of the valve stem 80 and plug 84 with respect to the valve seat 86.

With regard to the hydraulic apparatus portion of the valve assembly, one hole 112 is positioned through a side wall of the hydraulic cylinder 92 extending to an inner portion of the cylinder 92 which is always under the piston 94 during its up and down excursions. Another hole 114 is positioned through the side wall of the hydraulic cylinder 92 extending to an inner portion of the cylinder 92 which is always above the travel of the piston 94. Both holes 112 and 114 include a conventional coupling fixture to respectively attach two high pressure hydraulic lines 116 and 118 thereto for providing hydraulic fluid to and from the hydraulic cylinder 92. The other end of the hydraulic line 116 is coupled to one port 120 of a three-way hydraulic spool valve 122 which may be similar to the conventional type manufactured by Moog having a capacity of 60 gal./min. or 15 gal./min. depending on the closing and opening specification requirements of the valve assembly. The other end of the hydraulic line 118 is coupled to the hydraulic system drain 124. A tee 126 is disposed in the line 116 between the valve 122 and the cylinder 92 to provide hydraulic fluid to one side of a standard dump valve arrangement 128 which has its other end coupled to another tee 130 which is disposed in the hydraulic line 118. High pressure hydraulic fluid is supplied over line 132 to the Moog valve 122 at port 134 and the third port 136 of the Moog valve 122 is coupled to the drain 124 of the hydraulic system. The pressure of the hydraulic fluid at port 120 of the Moog valve 122 which is representative of the pressure of the hydraulic fluid under the piston 94 in the hydraulic cylinder 92 is governed by an electrical signal 138 which may be generated from an electronic servo controller 140. The controller 140 generally operates on an error identified between the valve position representative signal 110 and a desired valve setpoint signal 142 utilizing some well known functions, normally characterized to the valve dynamics, to generate the electrical signal 138.

In operation, as the pressure of the hydraulic fluid source over line 132 rises to a predetermined operational valve, the dump valve 128 is closed and the pressure under the piston 94 in the hydraulic cylinder 92 is governed by the setting of the three-way Moog valve 122. Normally, a desired position setpoint signal 142 is provided to the electronic servo controller 140 which responds by changing the value of the electrical signal 138 to regulate the pressure under the piston 94. Since the valve stem 80 and plug 84 are mechanically linked to and moved proportionately with the piston 94, steam flow through the valve cavity 82 may be controlled in proportion to the pressure under the piston 94, that is, under steady state conditions. However, in moving the valve stem 80 and plug 84 from one position to another with respect to the valve seat 86 in order to alter the steam flow through the valve cavity 82, problems may arise which may be better understood upon further analysis of the operation of the valve assembly with respect to the forces applied therein.

Forces generally acting to close the valve which are exemplarily illustrated in FIG. 2 are the spring force $F_{spg}$, the force of gravity on the movable mass of the valve assembly $F_{wt}$, and usually the force associated with the difference in steam pressure across the valve plug 84 $F_{\Delta p}$. The force which is primarily used to position the valve to regulate steam flow is the force $F_{hyd}$ under the piston 94 in the hydraulic cylinder 92, essentially the hydraulic pressure under the piston 94 multiplied by the effective area of the piston 94. Forces which tend to impede or act against valve travel are the frictional forces accumulatively denoted by $f_r$. These frictional forces primarily exist in the guide clearances at the bushing area 76, at the clearances 98 and 100, and at the interface of the piston 94 with the inner side wall of the cylinder 92. There are two types of frictional forces: the break or static friction which must be overcome before valve movement may occur; and the moving friction which must be overcome during valve movement. The static friction force is greater than the moving friction force and both friction forces always act in the direction to oppose valve travel. In equilibrium, the forces on the valve may be equated as follows:

$$F_{hyd} = F_{spg} + F_{\Delta p} + F_{wt} \pm f_r \qquad (1)$$

It is well understood that once the force equation (1) becomes unbalanced, movement of the valve stem and plug will occur in accordance with well known differential equations of motion. That is, once the force $F_{hyd}$ of the hydraulic pressure under the piston 94 becomes greater than the accumulated forces to the right of the equation (1), the valve stem 80 and plug 84 are positioned to increase valve opening at a rate in accordance with a motion time function based on the difference in forces between the right and left sides of the equation (1). And similarly, once the accumulated forces to the right of equation (1) becomes greater than the force $F_{hyd}$, then the valve stem 80 and plug 84 are moved toward a closed position using the same equations of motion based on the imbalance of forces.

Under emergency conditions, the hydraulic fluid and pressure associated therewith under the piston 94 in the hydraulic cylinder 92 is displaced as expeditiously as possible by actuating the dump valve 128. Normally, the valve assembly and hydraulic apparatus associated therewith respond in an emergency situation to permit travel of the valve plug 84 from a full open position to a full closed position, (i.e., seated to substantially interrupt steam flow through the valve cavity 82) within a predetermined time interval, say 150–200 milliseconds, for example, after reception of the actuating dump valve signal (refer to signals 58 and 60 in FIG. 1), thereby preventing the steam turbine from overspeeding beyond its margin of safety, say 120% of synchronous speed, for example.

An initial margin of operability is normally established in the design of the valve assemblies wherein the maximum spring force $F_{spg}$ is usually derived to have a predetermined percentage margin, say 30%, for example, to cause a break away movement overcoming all the accumulative anticipated forces acting against valve movement in the closing direction in the absence of hydraulic force $F_{hyd}$ and wherein further the maximum high pressure value of the hydraulic fluid is usually derived to a predetermined percentage margin, say 20%, for example, to cause a break away movement overcoming all the accumulative anticipated forces acting against valve movement in the opening direction. Of course, it is well known that during normal steam flow operation, the guide clearances of each valve in the steam turbine are subject to such aggravating factors as misalignment, wear, erosion and build-up of oxides and mineral deposits which all act to diminish the initially established operational force margins of each valve by increasing the break away and moving frictional force levels of each valve.

If these frictional forces are permitted to increase without some kind of preventive maintenance to a level which cannot at times be overcome by the other accumulative operating forces of the valve, the valve will no longer be considered operable. This is an especially undesirable valve malfunction state to have existing at the time of an emergency trip, whereby one or more valves may be prevented from closing entirely or from closing within the predetermined emergency closing time interval which could allow steam to continue to flow through the steam turbine possibly accelerating it to dangerous levels of overspeed. Another undesirable valve malfunction possibility is when an excessive amount of frictional force is developed in the valve preventing one or more of the steam admission valves from opening or allowing only partially opening thereof which could limit the amount of power being generated by the facility. While not as deleterious, in nature, as a malfunction during an emergency trip situation, the latter valve malfunction could result in substantial loss of revenue for the power generation station. In addition, even a moderate increase in the amount of frictional forces may render erratic or discontinuous response in valve movement to desired setpoint changes possibly causing unstable behavior in the power generation of the facility which is understandably undesirable when the power generation facility is coupled to a power system grid which has other power stations cooperatively functioning on the same grid.

Generally, it has become common practice in most power plant facilities, to test the steam turbine admission valves periodically by tripping them closed and returning them back to their original positions prior to test to ensure that they are functioning properly. However, testing procedures of this type merely indicate that the valves will operate expeditiously in an emergency trip situation at the time the valve is being tested, but provide no indication of the diminishing operational force margins resulting primarily from the build-up of frictional forces within the valve assembly as described supra. For example, it may be possible for one or mor valves to be on the verge of impending inoperability or marginal operability during one valve test and go undetected. If these same valves incur an additional build-up of frictional forces in the time period between tests, which may be at times a week or more, then the probability of a forced outage occurring as a result of deleterious effects caused by an overspeed condition is increased substantially. In order to prevent the build-up of frictional forces in their valve assemblies, some power plant facilities have went so far as to enact periodic plant shut-down procedures whether required or not during which time the steam admission valves are disassembled and inspected as a preventive maintenance precautionary step. While decreasing substantially the probability of a forced outage, these very lengthy test procedures render the power plant unavailable to generate needed electrical power to the power system grid, whereby the utility must withstand the substantial loss of revenue during each of the preventive maintenance plant shut-downs.

Evidently, the consequences of unavailability due to either planned or forced outages resulting from the prevention of or the occurrence of one or more malfunctioning valves may be quite significant in terms of loss of revenue and costly repair of a power generating facility, not even considering the possibility of injuries or fatalities to operating personnel which may result from the deleterious effects from a runaway overspeed condition. For these reasons, it is believed that an improved method of testing the steam admission valve assemblies in order to analyze the operation thereof and diagnose an impenging malfunction as a result of increasing frictional force build-up therein is of paramount importance in reducing the frequency of planned preventive maintenance shutdowns and the probability of the occurrence of a forced outage.

SUMMARY OF THE INVENTION

Steam turbine admission valve assemblies include a valve cavity adapted to have steam flow therethrough from an input port to an output port thereof; a movable mechanism having a portion thereof adjustedly oriented in the valve cavity to regulate the flow of steam therethrough; and a support structure having a plurality of clearances for guiding the movable mechanism through its adjustedly orientations. Associated with each guide clearance is a frictional force which impedes the movement of the movable mechanism. In accordance with the broad principles of the present invention, a method of testing these steam turbine admission valves comprises the steps of applying a first force to the movable mechanism to encourage movement in one direction about a quiescent valve stroke position orientation; applying a second force to the movable mechanism to encourage movement in another direction about the quiescent valve stroke position orientation; measuring a valve assembly parameter which is representative of the time values of the first and second forces applied to the movable mechanism; and correlating the measured time values of the valve assembly parameter associated with the first and second forces to determine values representative of the frictional forces associated the guide clearances of the valve assembly about the quiescent valve stroke position orientation. The method further includes the steps of determining a minimum marginal value difference between each of the measured time values associated with the applied first force and a first predetermined value, and the measured time values associated with the applied second force and a second predetermined value. In addition, the steps of the method are repeated about various quiescent valve stroke position orientations of the movable mechanism along its range of adjustment. Still further, the steps of the method are repeated substantially about a quiescent valve stroke position orientation for a plurality of times wherein the determined minimum marginal value differences associated with the applied first and second applied forces from the plurality of times are correlated to derive the likelihood of valve inoperativeness due to gradual build-up of the frictional forces.

More specifically, in hydraulically operated steam admission valve assemblies, the step of applying the first and second forces includes regulating the pressure of hydraulic fluid within a hydraulic actuator portion of the valve assembly to encourage adjustment of the orientation of the portion of the movable mechanism in the one and another directions, respectively, about a quiescent valve stroke position orientation and further, the step of measuring a valve assembly parameter includes measuring the regulated hydraulic pressure within the hydraulic actuator portion of the valve assembly during the adjustment of orientation of the movable mechanism in the one and another directions about the quiescent valve stroke position orientation. Furthermore, for the step of determining the minimum marginal value differences, the first and second predetermined values are preferably the maximum and minimum possible hydraulic pressures which may be applied to the valve actuator.

BRIEF DESCRIPTION OF THE DRAWINGS

FIGS. 4A, 4B, 5A and 5B illustratively represent selected recorded parameters of the valve assembly under test with respect to time in accordance with applicant's disclosed method.

DESCRIPTION OF THE PREFERRED EMBODIMENT

Figure 1:
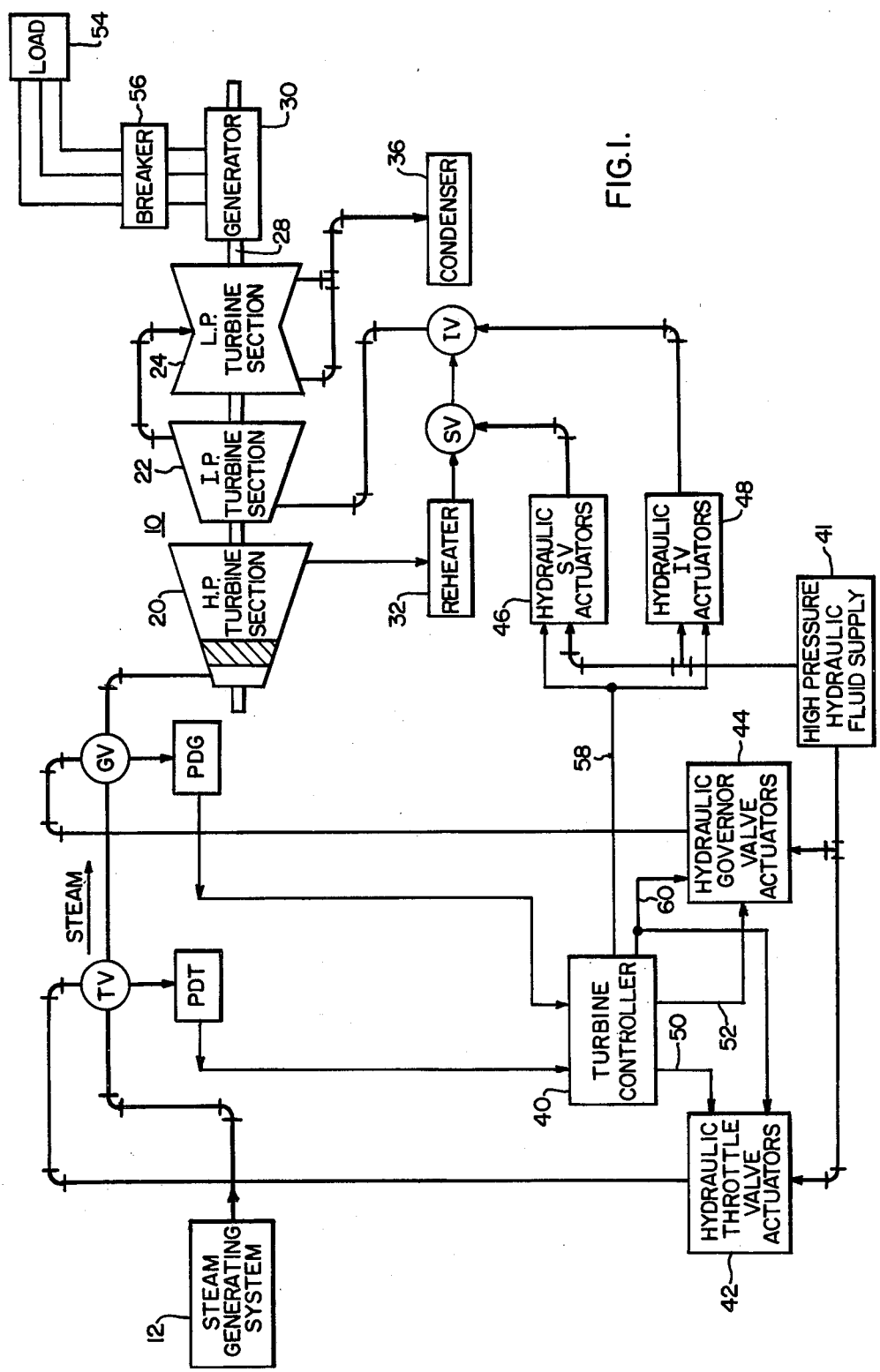
FIG. 1 is a schematic block diagram of a steam turbine-generator power plant embodying a number of steam turbine admission valves suitable for testing in accordance with applicant's broad inventive principles.
Figure 2:
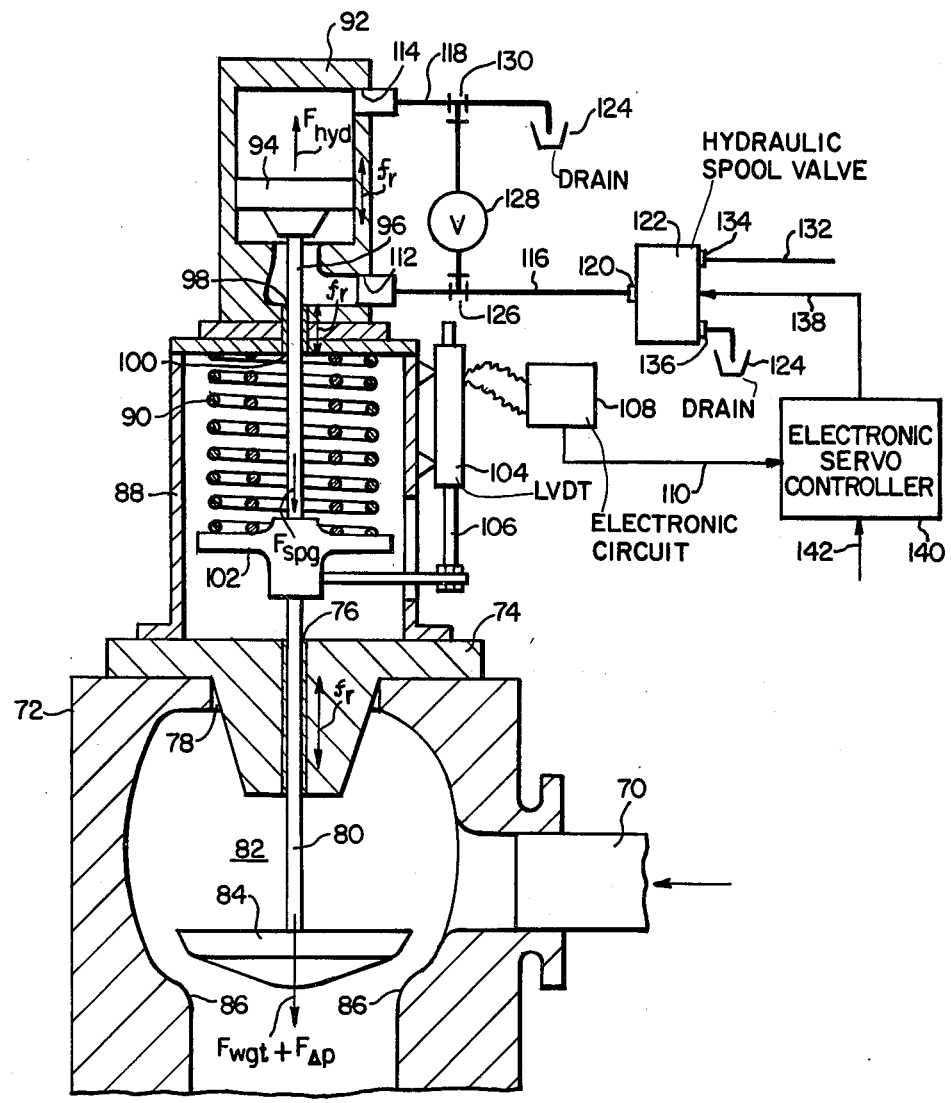
FIG. 2 is an illustrative cross-sectional view of a typical hydraulically operated steam turbine admission valve.
Figure 3:
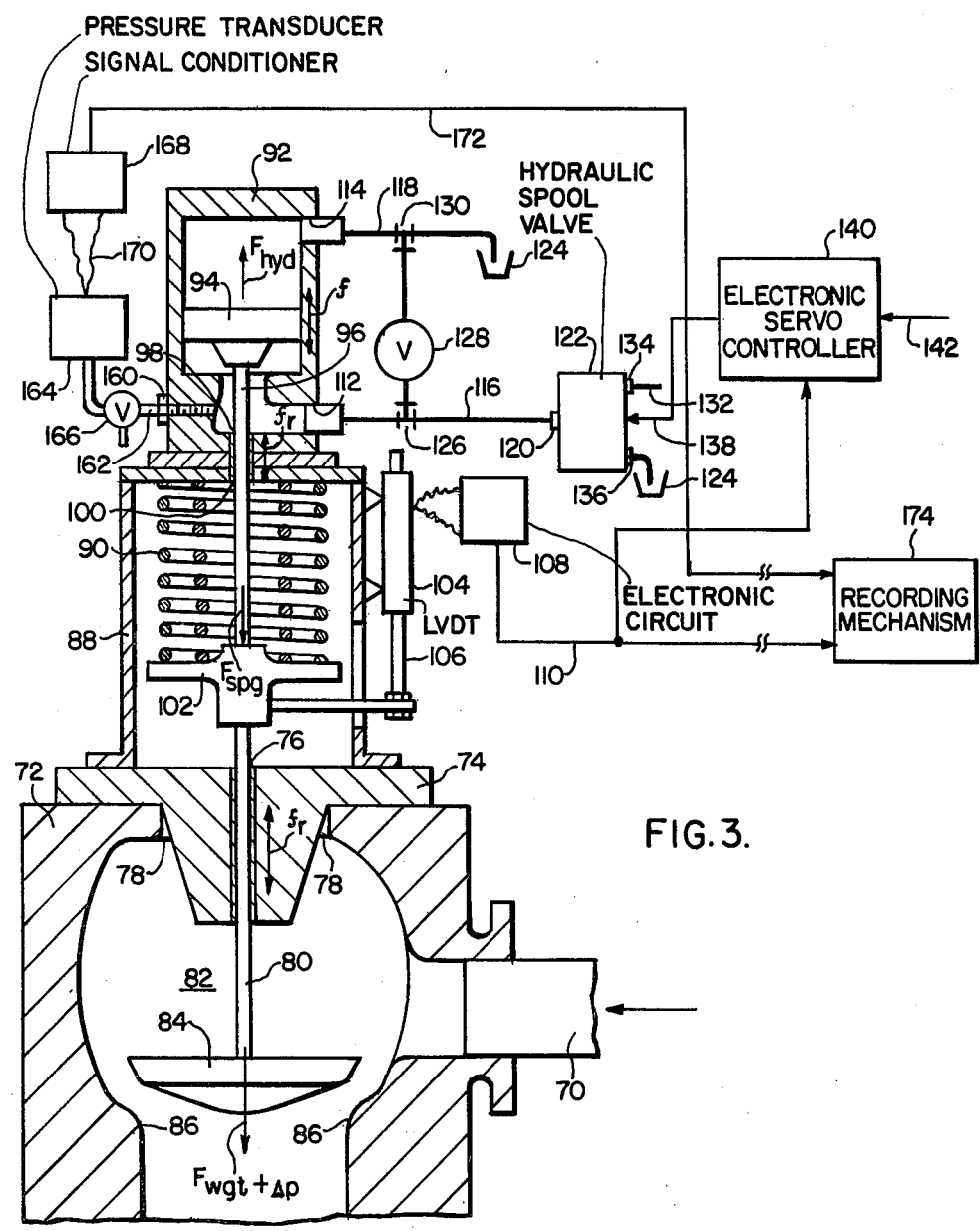
FIG. 3 depicts additions and modifications to the typical valve shown in FIG. 2 which render it suitable for testing according to the steps of applicant's disclosed method.

The modifications and additions to a typical steam admission valve assembly such as that shown in FIG. 2 to accommodate a preferred method of valve testing in accordance with the broad principles of applicant's invention are described herefollowing in connection with the embodiment shown in FIG. 3. Referring to FIG. 3, disposed through the side wall of the hydraulic cylinder 92 is a high pressure hydraulic fitting 160 which extends into an inner portion of the hydraulic cylinder 92 making contact with the hydraulic fluid which exists under the piston 94. The fitting 160 may be of the pipe threaded variety dimensioned to have approximately a ¼ inch to ⅛ inch reduction. A high pressure hydraulic line 162 may be used to couple a conventional pressure transducer 164 to the high pressure fitting 160. The pressure transducer 164 may be similar to the type manufactured by Baldwin Lima Hamilton, model No. DH-F which may have a dynamic range of 0 to 2,000 PSIG. Disposed within the hydraulic line 162 between the pressure transducer 164 and fitting 160 may be a conventional hydraulic isolation valve 166. A conventional circuit 168 may be coupled to the electrical signal output of the pressure transducer 164 for signal conditioning and amplification thereof. Accordingly, the electrical circuit 168 provides an output signal 172 which is representative of the hydraulic pressure within the hydraulic cylinder 92 under the piston 94. It is understood that the hydraulic pressure under the piston 94 acting on the effective surface area of the piston 94 effects the force on the movable portion of the valve assembly to encourage it to more in an opening or closing direction. Therefore, the signal 172 is, more importantly, also representative of the force acting on the movable portion of the valve assembly as related to the left hand term of the equation (1). This signal 172 may be coupled to one input of a recording mchanism 174 which may be of the type similar to that manufactured by Bell and Howell, Model No. 5-139. These type recording mechanisms are more commonly termed strip chart recorders or oscillographs. Another modification to the valve assembly permits the valve position measuring signal 110 to also be coupled to another input of the recording mechanism 174.

In operation, the movable portion of the valve assembly which is comprised of those internal elements of the valve assembly that are permitted to move with respect to its fixed structure may be adjusted in a desired orientation to regulate the steam flow flowing through the valve cavity 82 by effecting a desired value at the valve position demand signal 142. Typically, the electronic position controller 140 normally detects a position error signal between the signals 142 and 110 and governs the Moog valve 122 utilizing signal 138 as a function of the detected position error signal. It is understood that signal 138 may also be generated by other means known to those having ordinary skill in the art and that the present embodiment is merely representative of one way of generating signal 138. Responsive to signal 138, the Moog valve 122 adjusts the pressure at port 120 which ultimately proportionately affects the hydraulic pressure under the piston 94 within the hydraulic cylinder 92 to encourage movement of the movable portion of the valve assembly to a new position or orientation. As the hydraulic pressure under the piston 94 is adjustedly increased to overcome the other forces acting on the movable portion of the valve assembly including the break away or static friction forces, the valve will begin to move in a direction to the desired new position or orientation. As the movable portion of the valve assembly begins to move, the frictional forces will change from a break away or static level to a moving level. The position or orientation of the movable portion of the valve assembly is monitored, as described hereabove, by the LVDT and the electrical signal 110 representative of this position is fed back to the electronic controller 140. As the orientation of the valve reaches that which is desired by the signal 142, the electronic controller 140 governs the Moog valve 122 to regulate the hydraulic pressure under the piston 94 in the cylinder 92 to within the constraints imposed by the opening and closing break away friction forces so that further movement of the movable portion of the valve is restricted. Measured valves of the electrical signals 172 and 110 may be indentified at times throughout the operation just described utilizing the recording mechanism 174. If the recording mechanism is a strip chart recorder, for example, a hard copy time graph may be produced which will be discussed in more greater detail herebelow.

If it is desired to have the movable portion of the valve re-oriented toward a closing position, for example, a new valve demand position signal may be effected over signal line 142 for these purposes. Consequently, the electronic controller 140 may govern the Moog valve 122 to ultimately decrease the hydraulic pressure under the piston 94 within the cylinder 92. Once the force corresponding to the hydraulic pressure under the piston 94 falls below the other forces acting on the movable portion of the valve assembly including the break away friction force, the movable portion of the valve assembly is caused to be adjustedly oriented in a closing direction. As the electrical signal 110 reaches that which is desired by the electrical signal 142, the electronic controller 140 in turn may govern the Moog valve 122 to cause the hydraulic pressure under the piston 94 to remain within the dead band region of the opening and closing break away friction values. Electrical signals 172 and 110 may be recorded by the recording mechanism 174 during the value closing operation just described.

Illustrative strip chart recordings of the electrical signals 172 and 110 during one example of applicant's preferred method of testing the valve assemblies of a typical power plant facility are shown in FIGS. 4A and 4B, respectively. In this exemplary method of testing, it is preferred that the movable portion of the valve assembly be adjustedly oriented about a quiescent valve stroke position orientation such as that shown by the dashed line 200 in FIG. 4B. It is understood that the scaling of the per channel recorded information of the recording mechanism 174 may be proportioned to any range of values. For example, the channel recording exhibited in FIG. 4A displays a range of 0 to 2,100 PSIG and the channel recording exhibited in FIG. 4B displays a range of valve position opening from fully closed to fully open.

In operation, it may be assumed that the valve assembly under test is positioned at an incremental value 202 below the quiescent valve stroke position orientation value 200 at a time prior to time denoted as $t_1$ in the strip chart recordings. It may also be assumed that prior to time $t_1$ that the Moog valve 122 has been governed to encourage movement of the movable portion of the valve assembly under test to a new valve stroke position orientation which may be represented by the incremental value 204 above the quiescent orientation value 200. The increase in hydraulic pressure under the piston 94 prior to time $t_1$ is illustrated in the recording channel exhibited in FIG. 4A by the curve 206 and accordingly, the adjusted orientation of the movable portion of the valve assembly is illustrated by the line 208 for excursions about the quiescent valve stroke position orientation 200 as shown in FIG. 4B. Prior to time $t_1$ and in response to the operation of the Moog valve 122, the signal 172 represented by line 206 increases until valve movement is established. At time $t_1$, the movable portion of the valve assembly begins to move towards the desired new orientation and the recorded hydraulic pressure 206 dips in value as static friction is overcome and movement occurs and then stabilizes during valve movement between times $t_1$ and $t_2$ as displayed in FIG. 4A.

At time $t_2$, the Moog valve 122 may be governed to lower the pressure under the piston 94 until motion is stopped and so that the movable portion of the valve assembly may be re-oriented to the incremental value 202 below the quiescent valve stroke position orientation value 200. The recorded pressure signal 206 may decrease in value until the movable portion of the valve assembly starts to move in the closing direction towards its desired new orientation. This movement may be detected at time $t_3$ as shown by the curve 208 in the recording channel exhibited in FIG. 4B. It is noted that in the recording channel of FIG. 4A, the line 206 reaches a minimum at time $t_3$ and then increases in value and stabilizes at a new higher value during the valve movement between times $t_3$ and $t_4$. This is indicative of the differences between break-away and moving friction levels.

In the recording channels which are exhibited in FIGS. 4A and 4B, the procedure just described is repeated such that at time $t_4$, the Moog valve 122 is governed to increase the hydraulic pressure under the piston 94 to arrest motion and then encourage movement of the movable portion of the valve assembly in an opening direction towards the desired position increment 204 above the quiescent valve stroke position orientation value 200. Again, the measured hydraulic pressure denoted by curve 206 in FIG. 4A reaches a maximum value at time $t_5$ indicative of its overcoming of the forces on the movable portion of the valve assembly including the opening break away friction force to render initial movement in the movable portion of the valve assembly in the opening direction. Thereafter, the measured pressure 206 decreases in value and finally stabilizes at a value during the change in orientation of the valve from time $t_5$ to $t_6$.

One set of operational force margins associated with the induced opening and closing operations of the valve under test may be determined from that portion of the recording channels as illustrated in FIGS. 4A and 4B described in connection with the time interval from $t_1$ to $t_6$. One or the other of the maximum points of curve 206 at 210 corresponding to time $t_1$ or 212 corresponding to $t_5$ may be subtracted from a maximum possible hydraulic pressure value, say 2,100 PSIG, for example, to derive the operational force margins 214 or 216, respectively, which correspond to the operational force margins in the opening direction of the valve assembly for the quiescent valve stroke position 200 selected for the time interval from $t_1$ to $t_6$. Furthermore, to derive the operational force margin in the closing direction for the time interval $t_1$ to $t_6$, the minimum value 218 of the recorded curve 206 occurring approximately at time $t_3$ may be subtracted from a minimum possible hydraulic pressure value which may be at 0 PSIG for the purposes of this preferred method and accommodating structure. The resultant difference therebetween denoted by 220 may be considered as the magnitude of the operational force margin in the closing direction of the valve assembly for the quiescent valve stroke position 200 selected for the test time interval of $t_1$ to $t_6$.

In addition to deriving the operational force margins for the quiescent valve stroke position 200 during testing interval $t_1$ to $t_6$, a value representative of the accumulative frictional forces operating to impede the movement of the movable portion of the valve assembly under test may also be determined. One possible method for accomplishing this is to calculate a mean value between the maximum point of the recorded curve 206 which is at 210 and the minimum point of the curve 206 which is at point 218. The mean value is denoted by the dashed line 222. This mean value at 222 may also be derived from the maximum 224 and minimum 226 stable points on the curve 206. The mean value at 222 is generally representative of the forces acting on the valve other than the frictional forces. The difference between the values of 210 and 222 may be representative of the magnitude of the break away friction force in the opening direction and the difference between the values 224 and 222 may be representative of the magnitude of the moving frictional force in the opening direction. Also, the difference between the values of 218 and 222 may be representative of the magnitude of the break away friction of the valve assembly in the closing direction and accordingly, the difference between the values of 226 and 222 may be representative of the magnitude of the moving frictional force in the closing direction.

To determine the rate at which these operational force margins are diminishing as a result of the gradual build-up of the frictional forces on the valve assembly under normal operation, the test procedures just described are repeated at various other time intervals like that shown between time $t_7$ and $t_{10}$ in the recording channels illustrated by FIGS. 4A and 4B, for example. If it is assumed that the quiescent valve stroke position orientation of the movable portion of the valve assembly is again adjusted to the level designated by dashed line 200 and that the requested excursions above and below the quiescent orientation level 200 are the same incremental values 202 and 204, respectively, then, prior to time $t_7$, the Moog valve 122 may be again governed to encourage the movement of the movable portion of the valve assembly in an opening direction towards the increment 204 above the quiescent orientation 200. The hydraulic pressure may be forced to build up under the piston 94 as shown by the curve 206 to a maximum value 230 corresponding to time $t_7$ concurrent with the initiation of valve movement as denoted by the curve 208. As the movable portion of the valve assembly is adjusted to its desired orientation, the hydraulic pressure under the piston 94 may be reduced and finally stabilized at approximately the value designated by 232 on the recorded curve 206.

Subsequently, at time $t_8$, the Moog valve 122 may be governed to cause a reduction in hydraulic pressure under the piston 94 in the hydraulic cylinder 92 to encourage movement of the movable portion of the valve assembly to a desired orientation in the closing direction which may be at the increment 202 below the quiescent orientation designated by 200. In response to this movement request, the recorded hydraulic pressure curve 206 may drop to a minimum value 234 concurrent with the initiation of valve movement at time $t_9$. Thereafter, the recorded hydraulic pressure curve 206 may increase and stabilize at a point designated by 236 approximately corresponding to the time $t_{10}$. The opening and closing operational force margins 240 and 242, respectively, may be similarly derived using the same procedure as that described above. That is, subtracting the maximum level 230 of the measured pressure curve 206 from the maximum possible hydraulic pressure designated by line 244, the difference being the magnitude of the operational force margin 240 in the opening direction. Similarly, the magnitude of the operational force margin 242 in the closing direction may be derived by subtracting the minimum value 234 of the recorded pressure illustrated by line 206 from the minimum possible hydraulic pressure designated by line 246. The frictional forces in the opening and closing directions may also be determined by first deriving a new mean value of forces denoted by the dashed line at 250 and then subtracting the values 230 and 232 therefrom to establish the break away and moving frictions, respectively, in the opening direction and subtracting the values 234 and 236 therefrom to establish the break away and moving frictional force levels, respectively, in the closing direction.

All of the operational force margins which are derived in the testing intervals like that shown between time intervals $t_1$–$t_6$ and $t_7$–$t_{10}$ may be correlated together with respect to time to illustrate the build-up of frictional forces generally associated with the guide clearances in the valve assembly at a selected valve stroke position and to indicate a trend which may be predictive of a point of inoperativeness of the valve assembly to regulate steam flow.

Figure 5A:
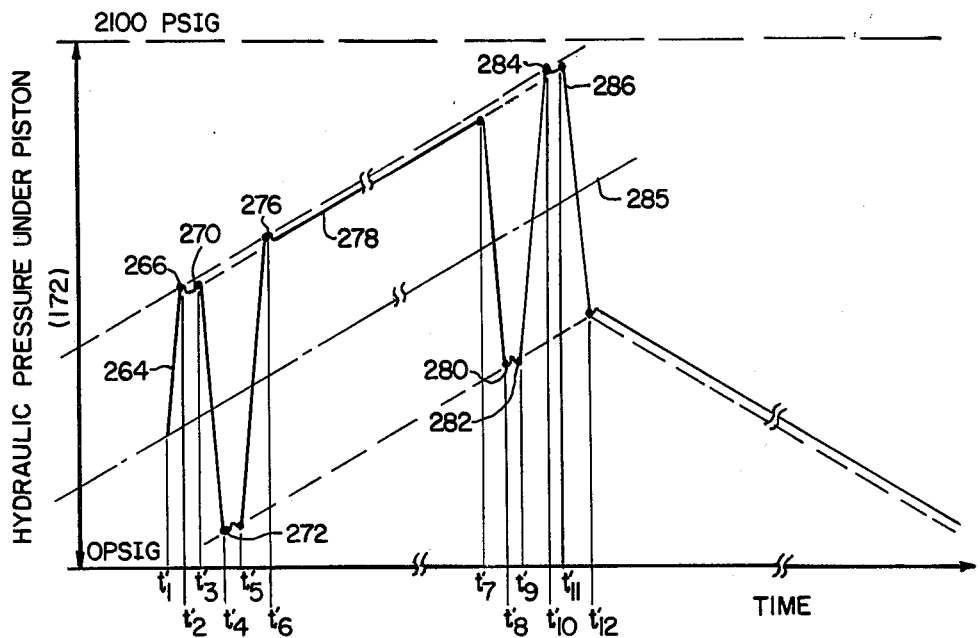
Figure 5B:
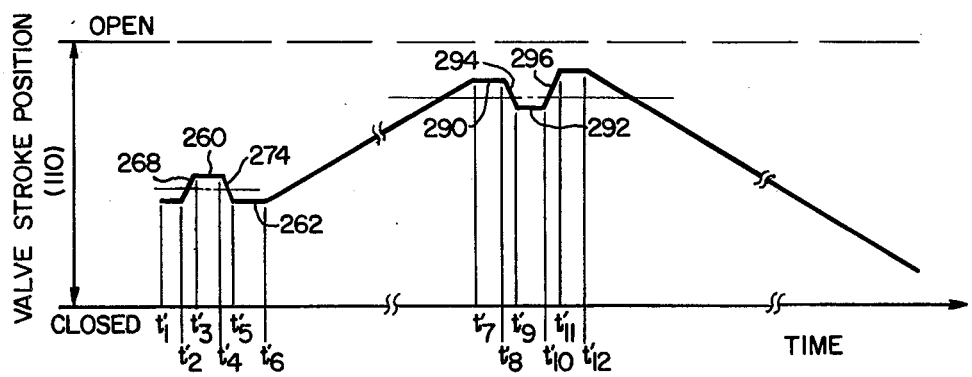

In another example of the preferred method of valve testing, a variety of quiescent valve stroke position orientations may be selected during a time when a valve under test is stroked slowly open or alternately, stroked slowly closed. FIGS. 5A and 5B illustratively represent two recording channels of the recording mechanism 174 which may monitor and record the electrical signals 172 and 110, respectively. These FIGS. 5A and 5B are not intended to be accurate graphic representations in time, but are used here to merely illustrate the behavioral characteristics of the hydraulic pressure and valve orientation during the instant exemplary method of valve testing. A quiescent valve stroke position orientation may be selected at the time interval between time $t_1'$ and $t_6'$. The moving portion of the valve assembly is adjustedly oriented at two levels 260 and 262 around the selected quiescent orientation as shown in FIG. 5B.

In operation, immediately prior to time $t_1'$, the hydraulic pressure under the piston 94 in the hydraulic cylinder 92 may be increased to encourage movement of the movable portion of the valve assembly in an opening direction. The signal 172 increases as shown by the curve 264 in FIG. 5A until it reaches a break away point 266 at which time the valve begins to change orientation in an opening direction as shown by that portion 268 of the curve displayed in FIG. 5B. As movement is initiated, the signal 172 drops to a stable value 270 on the curve 264 and remains at that value while movement is occurring. At a subsequent time $t_3'$, the hydraulic pressure under the piston 94 may be caused to decrease to arrest motion and to encourage adjustment of the orientation of the moving portion of the valve in the closed direction. During the excursion of signal 172 from its stable level 270 to a minimum value 272, the valve orientation remains motionless at approximately level 260 as shown in FIG. 5B. When signal 172 reaches its break away value at 272, movement is initiated in the closing direction as indicated by that portion 274 of the curve displayed in FIG. 5B. At a time subsequent to $t_4'$, say time $t_5'$, the valve may again be governed to move in an opening direction by causing an increase in pressure under the piston 94. Again, during the excursion of recorded pressure 264 until break away occurs at point 276, the valve orientation remains motionless at approximately level 262. Thereafter, the moving portion of the valve assembly is adjustedly re-oriented towards a more open position. As understood, the electrical signal 172 will stabilize at a value which is changing proportionately with the valve movement as indicated by the line 278 in FIG. 5A.

At another selected quiescent valve stroke position orientation during another time interval, say from $t_7'$ to $t_{12}'$, for example, the procedure for testing the valve as previously described may be repeated. Break away 280 and stable 282 levels of signal 172 are representative of the frictional forces of the valve assembly with respect to the derived mean value of forces denoted by line 285 as the valve is directed in the closing direction. And, similarly, break away 284 and stable 286 levels of signal 172 are representative of the frictional forces of the valve assembly with respect to the derived mean force level 285 as the movable portion of the valve assembly under test is directed in an opening direction. Portions 290 and 292 of the curve displayed in FIG. 5B are representative of the levels of valve orientation about the selected quiescent orientation which may remain substantially constant during the force excursions of the testing period from $t_7'$ to $t_{12}'$. Portions 294 and 296 of the same curve are illustrative of valve movement in the closing and opening directions about the quiescent valve stroke position orientation which was selected for this test interval.

It is understood that the previous two test intervals described in connection with the illustrations of FIG. 5A and 5B are merely representative of the type of test which may be applied at various valve orientations to any of the steam turbine admission valve assemblies of the steam turbine power generation plant. It is further understood that the valve under test need not be stroked linearly or proportionately in an opening direction in order for these tests to be applied as shown in FIG. 5A. The valve orientations of the valve assembly under test need only be governed to their selected quiescent valve stroke positions by adjustedly governing the pressure under the hydraulic piston 94 in the cylinder 92 in some known fashion. It is still further understood that these test methods while described in connection with moving of the movable portion of the valve assembly in an opening direction may also be conducted by adjustedly orienting the movable portion of the valve assembly in a closed direction without deviating from the principles of applicant's invention.

One of the primary purposes for testing a steam turbine admission valve assembly at various selectable valve stroke position orientations is because it is well known that the frictional forces are not always distributed uniformly along the movable portion of the valve assembly. In some cases, deterioration of the valve stem 80 and the cavity 82 may occur non-uniformly along its length. Build-up of deposits thus may occur at various points along the stem 80 and thus will not be detected until those portions make contact with the guide clearance 76, for example. Misalignment along the movable portion of the valve assembly is also a known contributor to non-uniform frictional forces and the aforementioned testing method may also be used to detect these occurrences.

If it is determined that the operational force margins of the valve assembly under test have significantly diminished, to a point of impending inoperability, a planned shut-down of the plant may be necessary in order to disassemble the valve assembly and remove the mechanisms which are causing the frictional force build-up. So as not to disassemble the whole valve assembly during these planned shut-downs, it may be desirable to disconnect the stem 80 from the plate 102 which may divide the movable portion of the valve assembly into two sections. A test of the section of the movable portion of the valve assembly which remains connected (refer to FIG. 3) may be conducted in accordance with the preferred method described in connection with FIGS. 4A, 4B, 5A, and 5B, supra. The frictional forces which are determined from the testing of this section may be compared with the frictional force levels already determined for the valve assembly during the operation of the plant. If it is found during this comparison that the majority of frictional force build-up is related to the connected movable section, then only the valve assembly portion associated with the connected section need be disassembled and the guide clearances and associated moving parts need be rehabilitated. Accordingly, this could avoid the necessity of disassembling the overall valve assembly mechanism when excessive frictional forces are identified.

While the preferred method of testing in connection with applicant's inventive principles has been described above in connection with a typical in-line valve arrangement illustratively shown in FIG. 3, it is understood by anyone of ordinary skill in the pertinent art that these same method steps may be similarly applied to valves with fulcrum arm linkages and for rotating valve shafts, such as butterfly valves, for example. One difference which may be desirable and more convenient for valve assemblies having rotating shafts is to measure angular stroke position or valve orientation rather than linear stroke position as was described in connection with the embodiment of FIG. 3.

I claim:

1. A method of testing a hydraulically operated steam turbine admission valve assembly which includes a support structure having a valve cavity disposed therein, said cavity adapted to have steam flow therethrough from an input port to an output port thereof; a movable mechanism having a portion thereof adjustedly oriented in said valve cavity to regulate the flow of steam therethrough; a hydraulic actuator linked to said movable mechanism and actuated by hydraulic fluid pressure to adjust the orientation of said movable mechanism, said support structure additionally including a plurality of guide clearances having a frictional force associated therewith for impeding the movement of said movable mechanism, said method comprising the steps of:

regulating the hydraulic fluid pressure of said hydraulic actuator to encourage adjustment of the orientation of the portion of said movable mechanism in one direction about a quiescent valve stroke position orientation;

regulating the hydraulic fluid pressure of said hydraulic actuator to encourage adjustment of the orientation of the portion of said movable mechanism in another direction about said quiescent valve stroke position orientation;

measuring the values of the hydraulic fluid pressure of said hydraulic actuator during the regulation thereof;

measuring the orientation of the movable mechanism to detect movement of the portion thereof in the one and the other directions about the quiescent orientation;

identifying a first measured value of hydraulic fluid pressure which occurs substantially at a time of detected initial movement of the movable mechanism in the one direction about the quiescent valve stroke position orientation, and a second measured value of hydraulic fluid pressure which occurs during detected movement of the movable mechanism in the one direction;

identifying a third measured value of hydraulic fluid pressure which occurs substantially at a time of detected initial movement of the movable mechanism in the other direction about the quiescent valve stroke position orientation, and a fourth measured value of hydraulic fluid pressure which occurs during detected movement of the movable mechanism in the other direction;

deriving a mean value from the identified measured values of hydraulic fluid pressure;

establishing values representative of break away and moving frictional forces, which impede movement of the movable mechanism in the one direction about the quiescent valve stroke position orientation, based on said derived mean value and said identified first and second measured values of hydraulic fluid pressure; and establishing values representative of break away and moving frictional forces, which impede movement of the movable mechanism in the other direction about the quiescent valve stroke orientation, based on said derived mean value and said identified third and fourth measured values of hydraulic fluid pressure.

2. The method in accordance with claim 1 further including the step of repeating the steps of the method for various quiescent valve stroke position orientations along the range of adjustment of the movable mechanism.

3. The method in accordance with claim 1 further including the step of repeating the steps of the method substantially about a quiescent valve stroke position orientation for a plurality of time intervals to diagnose the likelihood of valve inoperativeness due to gradual build-up of the frictional forces.

* * * * *